United States Patent
Shih et al.

(10) Patent No.: US 7,405,848 B2
(45) Date of Patent: Jul. 29, 2008

(54) SCANNING DEVICE AND METHOD USING PAIRED DIFFERENTIAL ANALOG SIGNALS

(75) Inventors: Chen-Hsiang Shih, Chang-Hua Hsien (TW); Chen-Ho Lee, Hsinchu (TW)

(73) Assignee: Transpacific IP, Ltd., Taipei (TW)

( * ) Notice: Subject to any disclaimer, the term of this patent is extended or adjusted under 35 U.S.C. 154(b) by 1065 days.

(21) Appl. No.: 10/605,355

(22) Filed: Sep. 25, 2003

(65) Prior Publication Data

US 2004/0105131 A1 Jun. 3, 2004

(30) Foreign Application Priority Data

Sep. 26, 2002 (TW) .............................. 91122106 A

(51) Int. Cl.
*H04N 1/04* (2006.01)
*H04N 1/40* (2006.01)
(52) U.S. Cl. ....................... 358/474; 358/483; 358/482; 358/445; 358/443

(58) Field of Classification Search ................. 358/445, 358/443, 474, 497, 494, 462, 483, 482, 505; 348/294, 311, E3.018, E5.091; 250/208.1, 250/216, 234–236; 382/312, 318, 319

See application file for complete search history.

(56) References Cited

U.S. PATENT DOCUMENTS

| 7,088,279 B2 * | 8/2006 | Muramatsu et al. ......... 341/155 |
| 2005/0046913 A1 * | 3/2005 | Chen et al. ................... 358/505 |
| 2005/0062864 A1 * | 3/2005 | Mabuchi ..................... 348/294 |
| 2007/0120989 A1 * | 5/2007 | Minami et al. ............... 348/266 |

* cited by examiner

*Primary Examiner*—Cheukfan Lee
(74) *Attorney, Agent, or Firm*—Stolowitz Ford Cowger LLP

(57) ABSTRACT

A scanning device having a cable for connecting various parts is provided. A method is provided using a differential pair of clock generated signals to cancel each other, thereby reducing electromagnetic emissions. The differential pair is characterized by each being in phase with the other with regard to frequency, and each being the reverse of the other in amplitude.

19 Claims, 4 Drawing Sheets

SCANNING DEVICE AND METHOD USING PAIRED DIFFERENTIAL ANALOG SIGNALS

CROSS REFERENCE TO RELATED APPLICATIONS

This application claims the priority benefit of Taiwan application serial no.91122106, filed on Sep. 26, 2002.

BACKGROUND OF INVENTION

1. Field of Invention

The invention pertains to the field of signal transmission. More particularly, the invention pertains to transmissions between components of a scanning device and a method using paired differential analog signals for the same.

2. Description of Related Art

The scanner is a device having functions disposed between copy machines and cameras. Scanners used to be expensive, and were almost exclusively used by specialists. Recently, due to the advancement in technology, coupled with market competition, the price of scanners has dropped. In fact, scanners have moved into the mainstream of personal computer peripherals.

Scanners can be divided into various categories either according to their sale price or function. Ordinarily, the scanner categories include handheld scanners, paper feeding scanners, card scanners, negative scanners, and the flat panel scanners, etc. Out of the above categories, the flat panel scanner is the most popular. The flat panel scanner is analogous to a flat glass panel. Texts or graphics are placed on top of the flat glass panel, the content of which is read by sensor. Because of simplicity of structure and ease of usage, coupled with the fact that it is highly expandable, flat panel scanners have moved into the mainstream of personal computer industry.

Currently, because the computer interface possesses an ever-increasing speed, scanners need to possess compatible data processing speeds as well. The increased speed results in undesirable electro-magnetic interference (EMI) which is generated as a concomitant of the increased speed.

Referring to FIG. 1, a commonly known prior art scanning device 10 is shown. The scanning device 10 includes an image capturing board 102 and a mainboard 104. By way of example, the image capturing board 102 may be a charge coupled device (CCD) board. A cable couples the image capturing board 102 to mainboard 104.

The above mentioned image capturing board 102 includes an image capturing device 106 which may be CCD. The above mentioned mainboard 104 includes an analog front-end 108 (AFE), analog to digital converter 110, and clock generator 112.

The operation of device 10 is described as follows. Initially, a clock generator 112 of the image capture device 104 generates a clock signal, which is applied to the image capture component 106. This way, the image capture component 106 is driven. Consequently, the image capture component 106 transforms an optic data signal that was captured into an analog electronic signal. At this juncture, the analog front-end 108 transforms the analog electronic signal into an analog front-end electronic signal. The analog front-end electronic signal is subject to an A/D converter 110, wherein the analog front-end electronic signal is converted into a digital signal, and the digital signal is output. But it should be noted that clock generator 112 includes high frequency signals such as shift clock signals ($\phi_1$, $\phi_2$), which are a pair of opposite phase signals. Opposite phase will be defined infra. It is known that opposite phase signals' electromagnetic interference cancel each other. However, in scanner technology, no known electronic signal transmission uses single end mode transmission.

Referring to FIG. 2, the wave shape of a commonly known electronic signal $V_l$ under single end mode transmission is shown. As can be appreciated, analog signal $V_l$ has a potential level Vos. Typically the electromagnetic interference is in direct proportion to signal potential level, frequency, and transmission distance. Because signal $V_l$ possesses high potential Vos as well as relatively high frequency and long transmission lines, the single end mode transmission can increase the electro-magnetic interference. Therefore, electro-magnetic interference can cause problems that are undesirable. Because the electro-magnetic interference can cause health problems, various jurisdictions have established standards with regard to the same. Therefore, how to reduce a scanning device's electro-magnetic interference so as to comport with the standards is important.

Therefore it is important to provide a scanning method and device wherein actual magnetic interference is reduced.

SUMMARY OF INVENTION

A scanning method and device are provided with the device having signals transmitting between its components. The signals cancel each other thereby reducing electromagnetic interference.

Accordingly, a scanning device having a differential analog transmission pair is provided. The device includes: an image capture component board and a main board. The image capture component board includes an image capture component for receiving data in the form of optic signals, and transforming the optic signals into analog electric signals, and a differential output driver coupled to the image capture component for transforming the analog electric signals into differential mode and outputting a differential analog electric signal. The main board is coupled to the image capture component board, and includes a differential input receiver for receiving the differential analog electric signal, and restoring the differential analog electric signal back to the analog electric signal.

Accordingly, a method for using a differential pair in a scanner is provided. The method includes the steps of receiving optic signals representing scanned data and transforming the same into analog electric signals, transforming the analog electric signals into differential analog electric signals, and receiving the differential analog electric signals and restoring the same back into analog electric signals.

DETAILED DESCRIPTION

Figure 3:
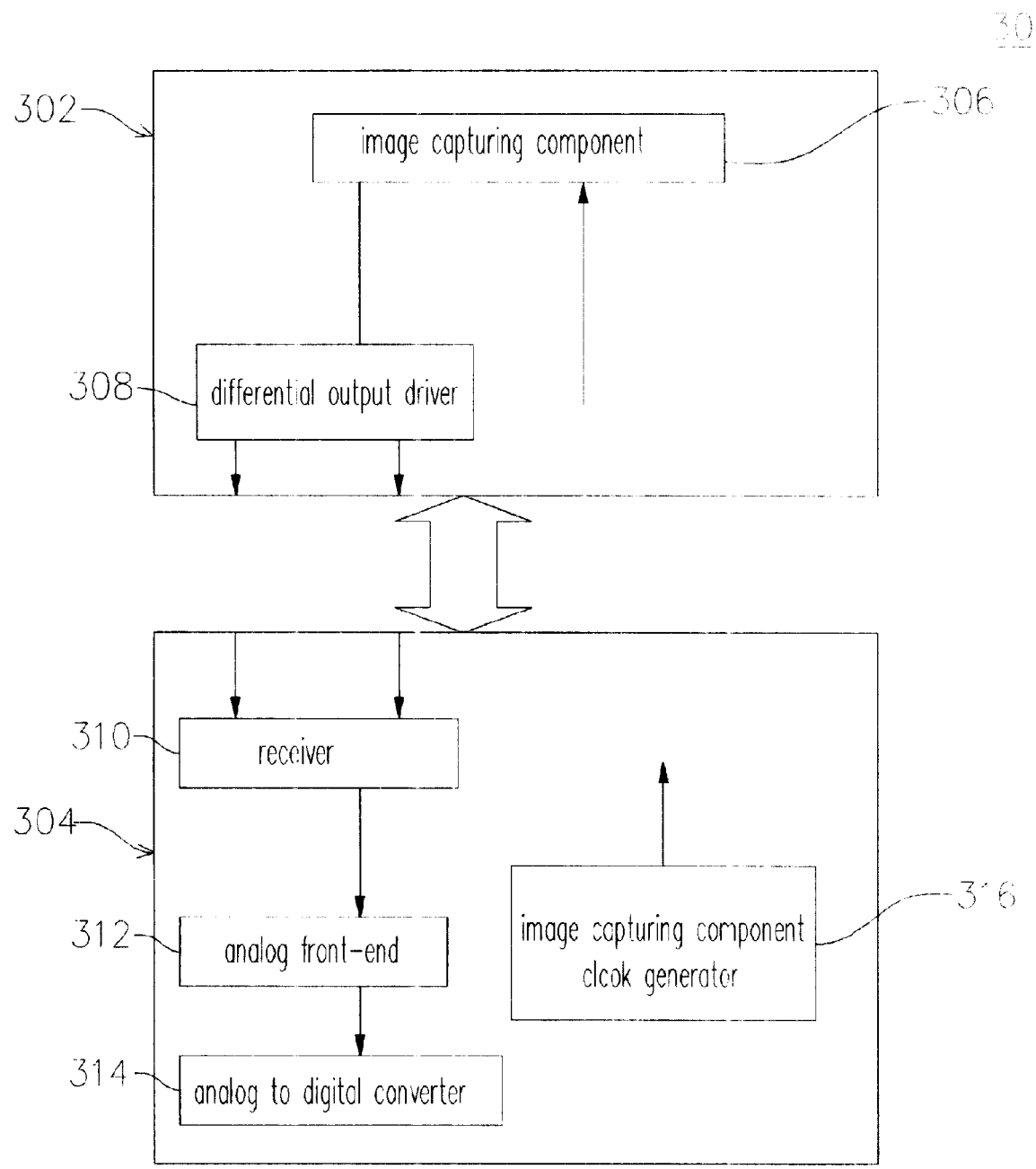
FIG. 3 shows a scanning device of the instant invention.

Referring to FIG. 3, a scanning device 30 includes an image capture component board 302 and main board 304. The image capture board 302 may be a CCD board. The image capture component board 302 and main board 304 are connected by cable. The image capture component board 302 includes an image capture component 306 and a differential output driver 308. The image capture component 306 may be such components as CCD, contact image sensor (CIS), or complementary metal oxide semiconductor (CMOS). The main board 304 includes a receiver 310, analog front 312, analog to digital converter 314, and clock signal generator 316.

The following describes the operations of the scanner 30. The above described image capture component 306 receives the optic signal of the scanned files. Component 306 further transforms the optic signal into an analog electronic signal. The above described differential output driver 308 transforms the analog electronic signal into differential analog electronic signals. For the waveform of the differential analog electronic signal, see FIG. 4.

Figure 2:
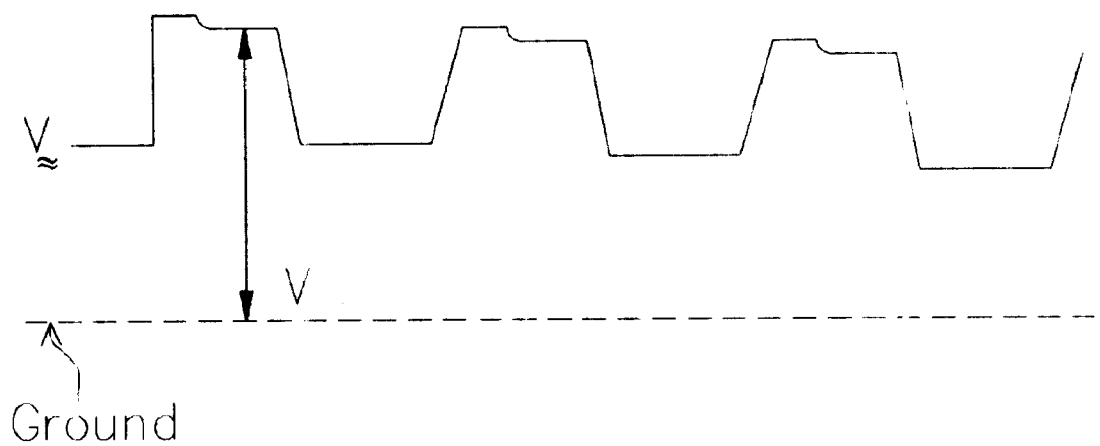
FIG. 2 shows a waveform of a commonly known prior art single mold analog signal transmission.
Figure 4:
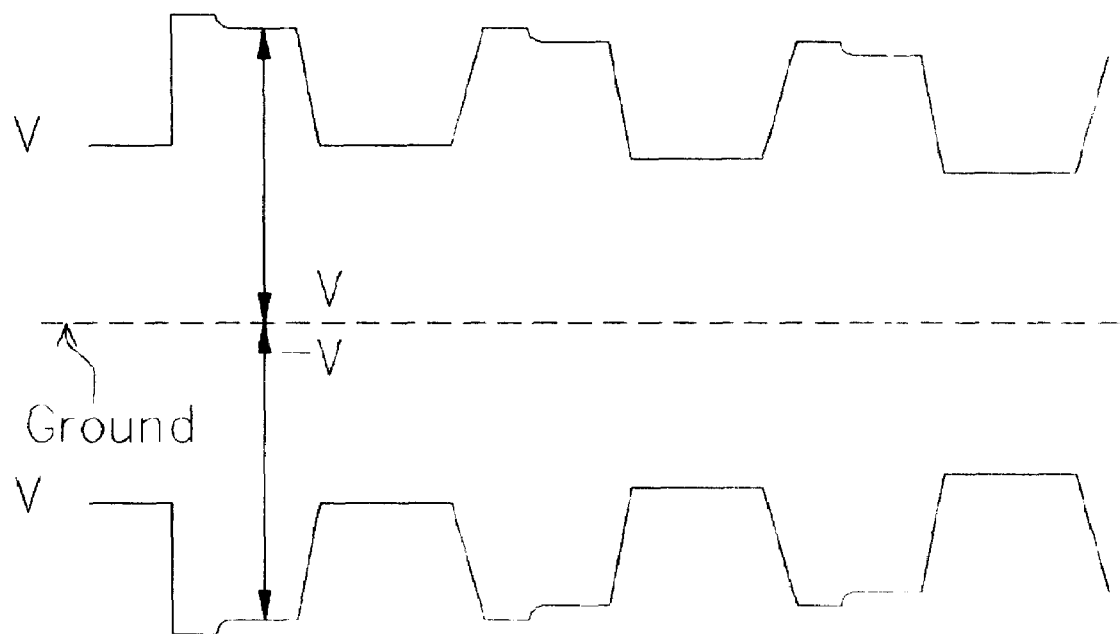
FIG. 4 shows a pair of waveforms of the instant invention.

Referring now to FIG. 4, a waveform according to the instant invention is shown. As can be seen, the differential analog electronic signal includes a signal identical to the analog electronic signal $V_I$ of FIG. 2. The signal is identical in the sense that the signal possesses identical electrical potential and identical phase relationships.

The waveform possesses a second signal $V_{02}$ having an electric potential of $-Vos$. The second signal $V_{02}$ possesses identical in block reverse phase in relation to $V_{01}$. Because the instant combined potential of both signals is zero, the electromagnetic interference is cancelled, facilitating transmission between the components such as differential output driver 308 and the receiver 310.

Figure 1:
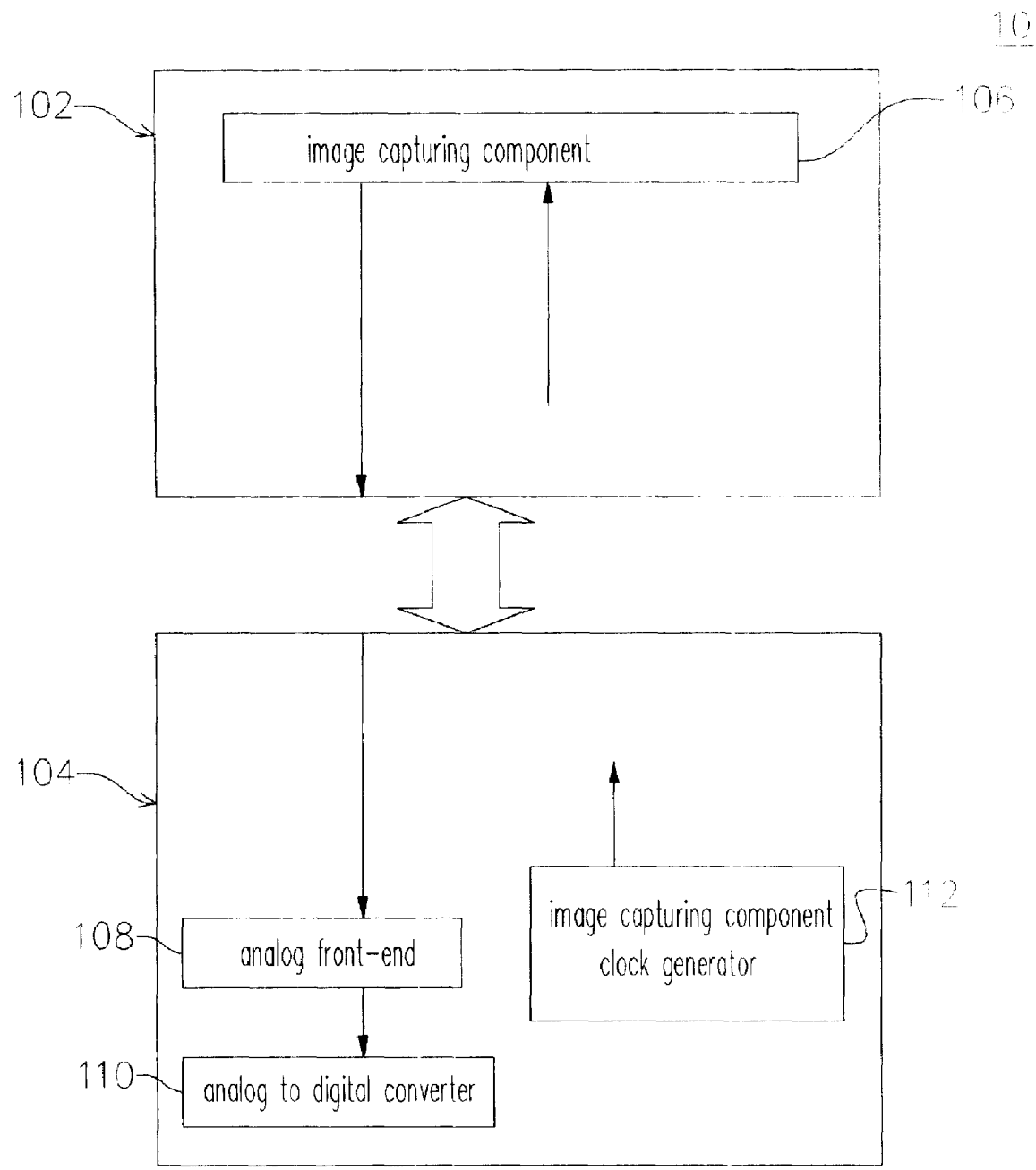
FIG. 1 shows a block diagram depicting a commonly known prior art scanning device.

Furthermore, the analog signal $V_{01}$ may be of the same phase as that of $V_I$ of FIG. 1, but the electric potential of $V_{01}$ is the potential of $V_I$ plus a bias potential. $V_{02}$ has the same phase but opposite polarity as that of $V_{01}$. Alternatively, signal $V_{01}$ may have the same phase relationship as that of the signal $V_I$, but the electric potential of signal $V_{01}$ is the difference of the potential of $V_I$ and the bias potential. In other words, the potential of $V_{01}$ equals to the potential of $V_I$ minus the bias potential, and $V_{02}$ is the reverse of $V_{01}$.

The differential input receiver 310 receives the differential analog electronic signals and transforms them back into an analog electronic signal. The analog front 312 is used to transform the analog electronic signal into an analog front signal. The analog to digital converter 314 is used to convert analog signals into digital signals. The clock generator 316 is used to provide the clock signals to the image capture component 306, to thereby drive the same.

Turning now to the operation of the scanning device 30, the first clock signal generator 316 provides the clock signals to the image capture component 306, thereby driving the same. Next, the image capture component 306 as disclosed receives scanned data in the form of optic signals and converts the same to analog electronic signals. The differential output driver 308 transforms the analog electronic signals into a differential mode and transmits at least one pair of differential signals. Furthermore, the differential input receiver 310 receives the at least one pair of differential signals and converts the differential signals into an analog signal. Following this, the analog front 312 transforms the analog signal into an analog front signal and uses the analog to digital converter 314 to transform the analog front signal into a digital signal. The digital signal is then output.

As can be appreciated, the instant invention changes the transmission mode of signals from the original analog electronic signal into a differential pair mode, thereby using the pairing to cancel electromagnetic interference. Specifically, the instant invention changes the transmission mode of signals going from the image capture component board 302 to the main board 304. In other words, based on the notion of using a differential pair generated by a scanning device, for example by clock generator 316, canceling each other out, electromagnetic noise is cancelled as well.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

The invention claimed is:

1. A scanning device having a differential analog transmission pair, the scanning device comprising:
   an image capture component board, including:
      an image capture component for receiving data in the form of optic signals, and transforming the optic signals into analog electric signals; and
      a differential output driver coupled to the image capture component for transforming the analog electric signals into differential mode and outputting a differential analog electric signal; and
   a main board coupled to the image capture component board, including: a differential input receiver for receiving the differential analog electric signal, and restoring the differential analog electric signal back to the analog electric signals.

2. The scanning device of claim 1, wherein the differential analog electric signal includes a non-phase reversal analog signal and a phase reversal signal.

3. The scanning device of claim 1, wherein the main board further includes:
   an analog front coupled to the differential input receiver for transforming the analog electric signals into an analog front electric signal; and
   an analog to digital converter coupled to the analog front for converting the analog front electric signal into a digital signal and outputting the digital signal.

4. The scanning device of claim 1, wherein the main board further includes a clock signal generator for generating a plurality of clock signals to be provided to the image capture component for driving the image capture component.

5. The scanning device of claim 1, wherein the image capture component includes a charge coupled device.

6. The scanning device of claim 1, wherein the image capture component includes a contact image sensor.

7. The scanning device of claim 1, wherein the image capture component includes a CMOS device.

8. A method for using a differential pair in a scanner, the method comprising:
   receiving an optic signal representing scanned data, and transforming the optic signal into analog electric signals;
   transforming the analog electric signals into differential analog electric signals; and
   receiving the differential analog electric signals, and restoring the differential analog electric signals back into analog electric signals.

9. The method of claim 8 further comprising:
   transforming the analog electric signals into an analog front electric signal; and
   converting the analog front electric signal into a digital signal using an analog to digital converter.

10. The method of claim 8, wherein the differential analog electric signals include a non-phase reversal analog signal and a phase reversal signal.

11. The method of claim 10, wherein the non-phase reversal analog signal and the phase reversal signal have phase reversing relationships with each other.

12. The method of claim 10, wherein the non-phase reversal analog signal is in-phase with the phase reversal signal, and the non-phase reversal analog signal has an electric potential equal to an electric potential of the analog electric signals plus a bias electric potential.

13. The method of claim 10, wherein the phase reversal analog signal is in-phase with the phase reversal signal, and the non-phase reversal analog signal has an electric potential equal to an electric potential of the analog electric signals minus a bias electric potential.

14. An apparatus comprising:
- means for receiving an optic signal representing scanned data, and transforming the optic signal into analog electric signals;
- means for transforming the analog electric signals into differential analog electric signals; and
- means for receiving the differential analog electric signals, and restoring the differential analog electric signals back into analog electric signals.

15. The apparatus of claim 14 further comprising:
- means for transforming the analog electric signals into an analog front electric signal; and
- means for converting the analog front electric signal into a digital signal using an analog to digital converter.

16. The apparatus of claim 14, wherein the differential analog electric signals include a non-phase reversal analog signal and a phase reversal signal.

17. The apparatus of claim 16, wherein the non-phase reversal analog signal and the phase reversal signal have phase reversing relationships with each other.

18. The apparatus of claim 16, wherein the non-phase reversal analog signal is in-phase with the phase reversal signal, and the non-phase reversal analog signal has an electric potential equal to an electric potential of the analog electric signals plus a bias electric potential.

19. The apparatus of claim 16, wherein the phase reversal analog signal is in-phase with the phase reversal signal, and the non-phase reversal analog signal has an electric potential equal to an electric potential of the analog electric signals minus a bias electric potential.

\* \* \* \* \*